US012090434B2

(12) United States Patent
Osborne et al.

(10) Patent No.: US 12,090,434 B2
(45) Date of Patent: Sep. 17, 2024

(54) AIR / WASTE WATER SEPARATOR

(71) Applicant: MAG Aerospace Industries, LLC, Carson, CA (US)

(72) Inventors: Deborah Anne Osborne, Redondo Beach, CA (US); Christoph Goeschel, Seattle, WA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

(21) Appl. No.: 17/723,655

(22) Filed: Apr. 19, 2022

(65) Prior Publication Data
US 2022/0331727 A1    Oct. 20, 2022

Related U.S. Application Data

(60) Provisional application No. 63/177,190, filed on Apr. 20, 2021.

(51) Int. Cl.
*B01D 45/08*    (2006.01)
*B01D 45/18*    (2006.01)

(52) U.S. Cl.
CPC ............ *B01D 45/08* (2013.01); *B01D 45/18* (2013.01)

(58) Field of Classification Search
CPC ....... B01D 45/08; B01D 45/18; F15D 1/0005; F15D 1/001; F15D 1/0015; F15D 1/04
See application file for complete search history.

(56) References Cited

U.S. PATENT DOCUMENTS

| | | | | |
|---|---|---|---|---|
| 732,548 A * | 6/1903 | Guillaume | ............ | B01D 3/008 261/110 |
| 1,519,541 A * | 12/1924 | Johnson | ............... | F02M 35/022 55/DIG. 28 |
| 1,791,304 A * | 2/1931 | Flick | ........................ | B04C 5/10 55/455 |
| 1,896,833 A * | 2/1933 | Bramsen | ............... | B01D 50/00 251/127 |
| 2,290,323 A * | 7/1942 | Graham | ................. | B01D 45/08 55/436 |
| 2,343,682 A * | 3/1944 | McCurdy | ........... | B01D 21/0054 210/512.1 |
| 2,896,743 A * | 7/1959 | Bradshaw | ............. | B01D 45/08 55/308 |
| 3,747,347 A * | 7/1973 | Ciraolo | .................... | F01N 1/083 60/309 |
| 3,875,061 A * | 4/1975 | Palma | ...................... | B04B 5/00 210/243 |
| 4,167,987 A * | 9/1979 | Turner | .................... | F01N 1/083 181/255 |
| 4,334,897 A * | 6/1982 | Brady | ..................... | F23J 15/04 55/440 |
| 4,359,329 A * | 11/1982 | Willeitner | ............... | F25B 43/02 210/DIG. 5 |

(Continued)

*Primary Examiner* — Dung H Bui
(74) *Attorney, Agent, or Firm* — Kilpatrick Townsend & Stockton LLP

(57) ABSTRACT

A system designed to separate moisture and waste water particulates from air flow for use in connection with compact vacuum toilet systems. There is provided a separator that both raises the position of the vent port, as well as provides a series of baffles to block and/or to collect and help route any collected moisture. The resulting moisture removal from the compact vacuum toilet system can help improve reliability and function of the system.

10 Claims, 7 Drawing Sheets

(56) References Cited

U.S. PATENT DOCUMENTS

| | | | | |
|---|---|---|---|---|
| 4,371,563 A * | 2/1983 | Muehlberger | B01D 47/024 | 261/119.1 |
| 4,543,219 A * | 9/1985 | Yamato | C07C 51/44 | 261/109 |
| 5,149,347 A * | 9/1992 | Turner | B01D 45/08 | 96/136 |
| 5,591,243 A * | 1/1997 | Colussi | B01D 45/08 | 55/327 |
| 5,703,338 A * | 12/1997 | Liese | F02K 1/827 | 181/268 |
| 5,840,198 A * | 11/1998 | Clarke | B01D 21/2422 | 210/522 |
| 5,882,386 A * | 3/1999 | McAferty | B01D 53/26 | 55/423 |
| 5,902,483 A * | 5/1999 | Edmondson | B01D 17/0208 | 210/DIG. 5 |
| 6,019,825 A * | 2/2000 | Greene | B04C 5/103 | 96/216 |
| 6,193,774 B1 * | 2/2001 | Durdag | B01D 45/08 | 55/385.6 |
| 6,231,645 B1 * | 5/2001 | Conrad | B04C 5/187 | 95/271 |
| 6,391,094 B2 * | 5/2002 | Ramos | B01D 19/0042 | 95/260 |
| 6,569,323 B1 * | 5/2003 | Pribytkov | B01D 45/12 | 210/512.1 |
| 6,837,912 B1 * | 1/2005 | Heumann | B04C 5/103 | 55/424 |
| 7,122,071 B1 * | 10/2006 | Gonda | B01D 19/0031 | 96/216 |
| 7,867,310 B2 * | 1/2011 | Baten | B04C 5/12 | 55/455 |
| 7,927,404 B2 * | 4/2011 | Kemoun | C10G 47/26 | 422/147 |
| 9,005,340 B2 * | 4/2015 | Azwell | B01D 46/003 | 55/413 |
| 10,286,347 B2 * | 5/2019 | Meister | B01D 45/08 | |
| 10,533,400 B2 * | 1/2020 | Rogers | B01D 17/045 | |
| 10,641,066 B2 * | 5/2020 | Mericas | E21B 43/08 | |
| 10,801,500 B2 * | 10/2020 | Jambigi | F04C 29/026 | |
| 11,383,248 B2 * | 7/2022 | Narciso | B01D 46/0032 | |
| 2001/0003892 A1 * | 6/2001 | Rikyuu | C23C 16/4412 | 55/444 |
| 2004/0163369 A1 * | 8/2004 | Lombana | B01D 45/12 | 55/452 |
| 2008/0209898 A1 * | 9/2008 | Succi | F01N 3/0215 | 60/311 |
| 2018/0161712 A1 * | 6/2018 | Murata | F01M 13/0405 | |
| 2019/0329156 A1 * | 10/2019 | Hoffman | B60T 17/004 | |
| 2019/0388818 A1 * | 12/2019 | Martin | B01D 45/16 | |
| 2020/0261840 A1 * | 8/2020 | Chuh | B04C 5/04 | |
| 2022/0096982 A1 * | 3/2022 | Olsen | B01D 53/265 | |

* cited by examiner

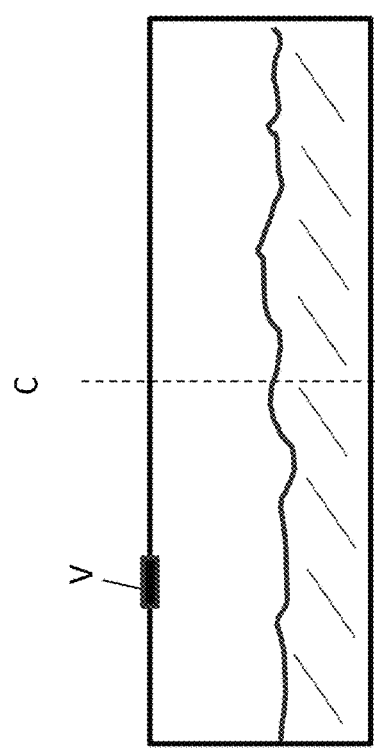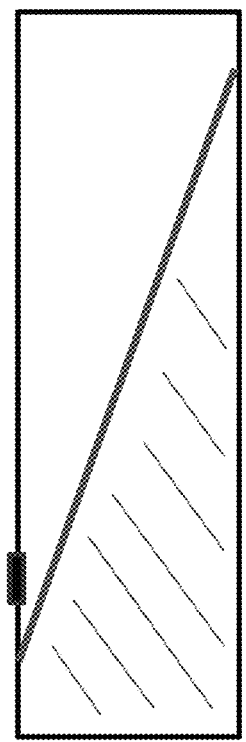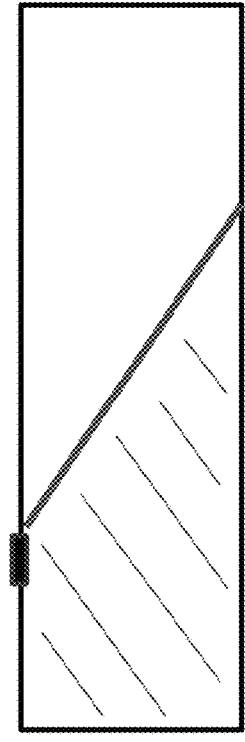

AIR / WASTE WATER SEPARATOR

CROSS REFERENCE TO RELATED APPLICATIONS

This application is related to and claims priority benefits from U.S. Provisional Application Ser. No. 63/177,190, filed on Apr. 20, 2021, entitled "COMPACT WATER SEPARATOR," the entire contents of which are hereby incorporated by this reference.

FIELD OF THE INVENTION

The field of the invention relates to a system designed to separate moisture and/or waste water particulates from air flow for use in connection with compact vacuum toilet systems. There is provided an air/waste water separator that both raises the position of the vent port, as well as provides a series of baffles to block and/or to collect and help route any collected moisture. The resulting moisture removal from the compact vacuum toilet system can help improve reliability and function of the system.

BACKGROUND

On business jets and other smaller aircraft or other vehicles, there can be a need for a compact vacuum toilet system (CVTS). During use of current CVTS, there is a need to separate moisture and waste particulates from the air removal process in the tank. Moisture and waste particulates can be corrosive and can damage other components in the system. For example, at certain tank levels and aircraft conditions, the vent port can become submerged in the waste and can cause clogging of the vent line, regardless of its position (open or closed) during a flush. Additionally, even after the flush, moisture-rich air flows through the vent port, creating potential problems.

One way that prior art systems removed moisture and waste particulates from air flow was to spin the moisture out of the vent air and drain the moisture back to the tank. For example, larger waste tanks could use a system that uses centrifugal forces to spin or project the moisture and waste particulates out of the airflow, and the moisture waste water droplets can fall back into the tank. However, this is not a viable option for compact vacuum toilet systems due to space. Accordingly, the present inventors have sought to prevent the vent tube from flooding, as well as to separate moisture and waste water particulates from the air flow in order to prevent corrosion on parts in the system.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The air/waste water separator of this disclosure seeks to address reliability issues that may occur in connection with a compact vacuum toilet system (CVTS) by removing moisture and particulates from the vent air and by reducing the likelihood of clogging the vent tube. Disclosed embodiments do this by either or both of raising the vent port and/or by adding a labyrinth for the air flow. (Although this disclosure finds particular use in connection with a CVTS, it should be understood that it may be used in connection with any type of vacuum toilet system.) Increasing the distance for airflow can help remove moisture/waste particulates from entering/progressing through the vent line and prevent clogging. Adding a labyrinth for the airflow can also help prevent moisture from progressing through the vent line and associated components.

BRIEF DESCRIPTION OF THE DRAWINGS

FIG. 7A shows a holding tank with fluid with no rotation or angle.

FIG. 7B shows the holding tank of FIG. 7A, showing fluid movement of the fluid at a first rotation level.

FIG. 7C shows the holding tank of FIG. 7A, showing fluid movement of fluid at a second higher rotation level, illustrating how the fluid can contact the vent port/line.

DETAILED DESCRIPTION

Figure 1:
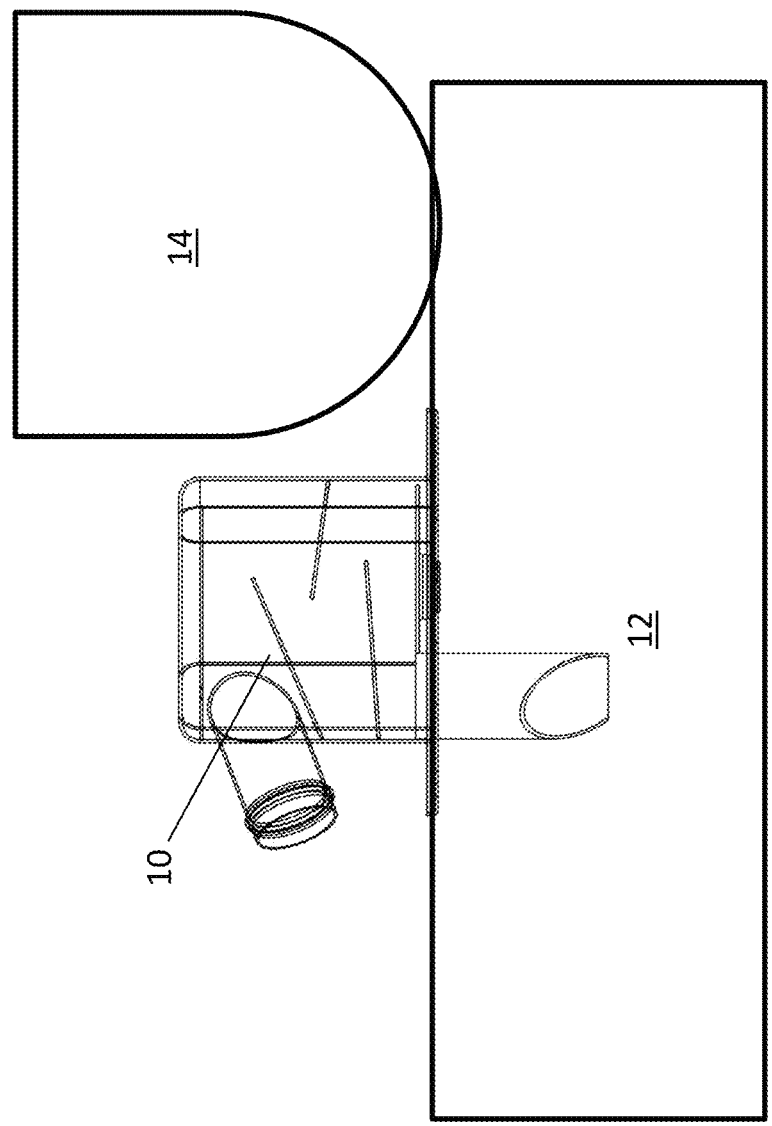
FIG. 1 shows a side perspective transparent view of a holding tank and a vacuum toilet bowl with a separator positioned in relation thereto.

The subject matter of embodiments of the present invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments provide a separator 10 designed for use in connection with a compact vacuum toilet system (CVTS). As background, a CVTS typically incorporates a waste holding tank 12 and a toilet bowl 14 (or other waste-receiving receptacle), as well as associated vacuum generator, a flush valve, and other vacuum toilet components (which are generally standard components and need not be described further herein). The toilet bowl 14 and the holding tank 12 are fluidly connected via an interlocking flush valve. The tank is fluidly connected to a vent line via a separator 10 described herein. The separator 10 may be mounted on top of the holding tank 12. As shown, the separator 10 generally has an inlet port 20, body walls 30, and an outlet port 50. The outlet port 50 functions as a vent port. The outlet port 50 has an outlet conduit 52 that connects with a flush valve. The inlet port 20 has an inlet conduit 22 that cooperates with the holding tank 12.

Providing and mounting the disclosed separator 10 above the holding tank 12 as shown results in positioning the outlet port 50/vent port at a raised position as opposed to the location of a traditional CVTS vent port "V", which would typically be positioned as is shown by "V" in FIGS. 7A-7C. These figures illustrate that at certain rotation levels, fluid held within the holding tank may contact the vent port/line "V." The present disclosure thus provides the outlet port 50 of the disclosed separator 10 as being raised above the holding tank 12 the distance of the height "H" of the separator. Raising the outlet port 50/vent port can help prevent moisture/fluid/waste from being transported into parts of the system further upstream. A raised outlet port 50/vent port prevents the port from submersion during aircraft flight angles and accelerations that cause the vent port to otherwise be partially or completely submerged.

This raised location can prevent fluids (mixed waste fluids, cleaning fluids, excrement, etc.) from contacting the vent port. This can be of particular advantage when an aircraft is taking off or landing, which causes movement of fluid within the holding tank 12, shown by the angle changes of FIGS. 7A-7C. When the angle of the fluid is such that sloshing of the fluid can cause fluid to contact the vent port, ingestion of the fluid/waste into the vent port can occur. This consequently can also mean that the waste/fluid can travel down into the flush valve, which is undesirable.

In addition to raising the outlet port 50/vent port, the disclosed separator 10 is also designed to ensure that any moisture or other fluid that may enter the separator through the inlet 20 (e.g., via sloshing, aircraft angle, etc.) is managed internally within the separator 10. The goal is to prevent a majority of moisture (or other fluid) from exiting the separator via the outlet port 50.

Figure 2:
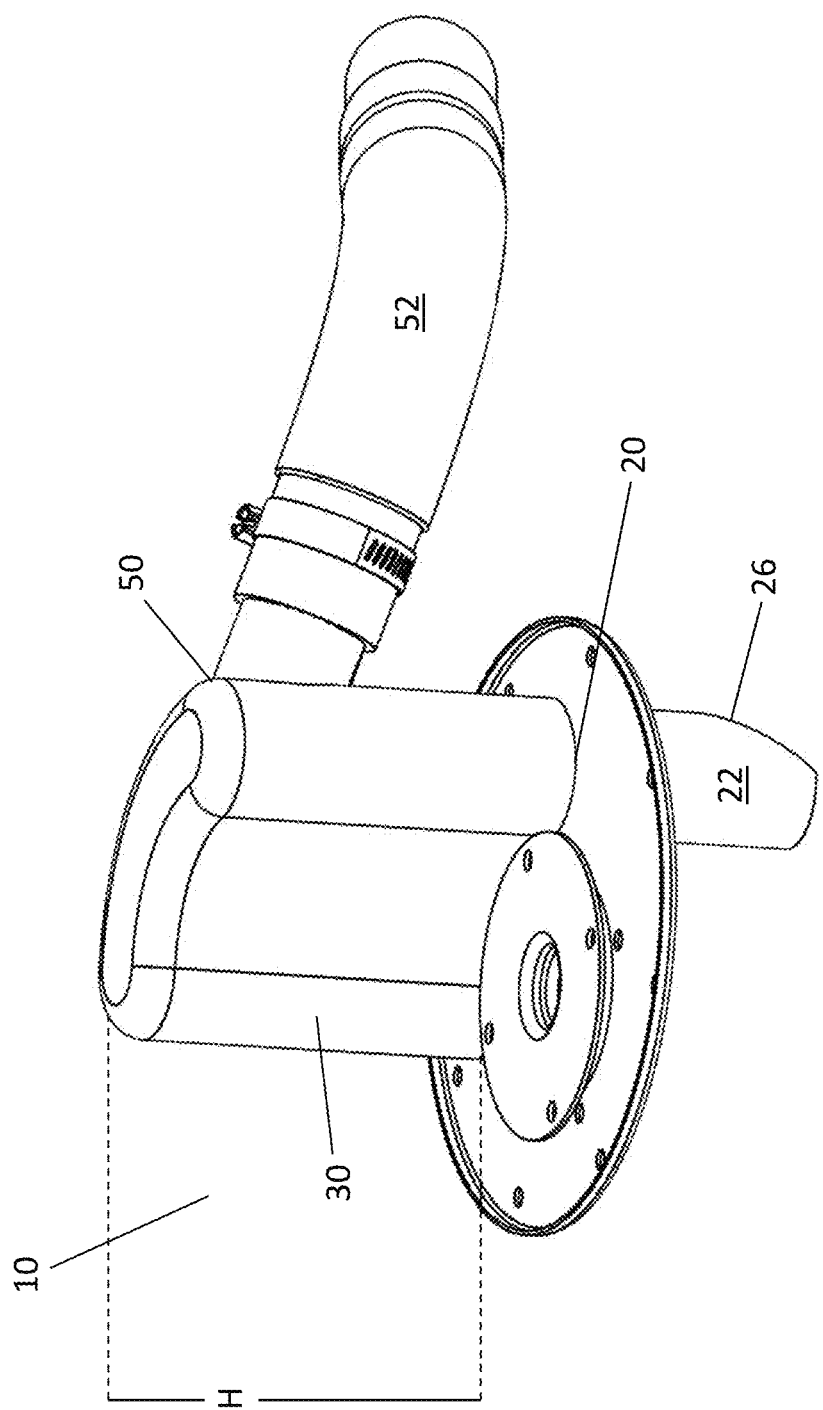
FIG. 2 shows a side perspective view of one embodiment of a separator according to this disclosure.
Figure 3:
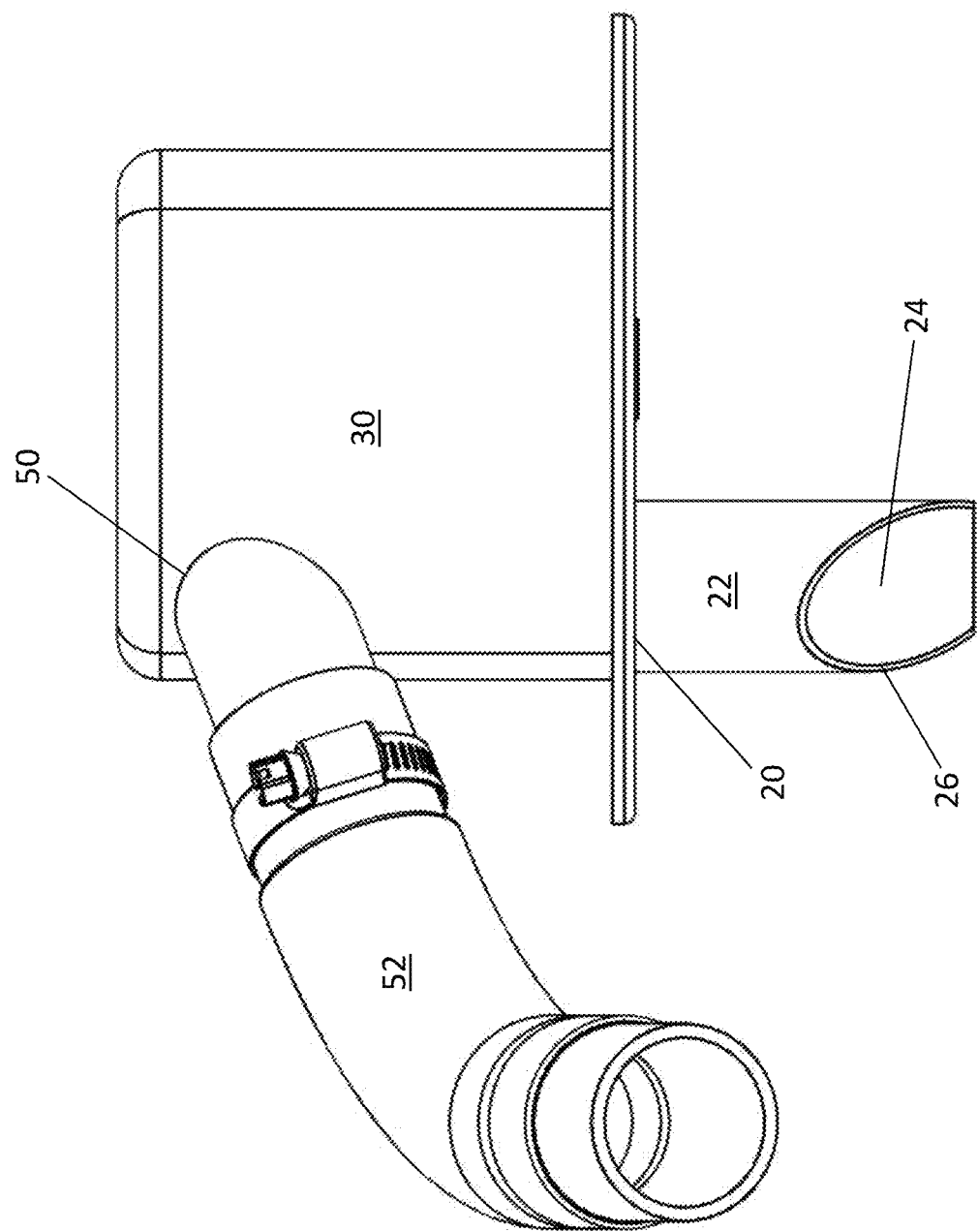
FIG. 3 shows a front plan view of the separator of FIG. 2.

As shown by FIGS. 2 and 3, the separator 10 has an inlet 20 and an associated inlet conduit 22 that is positioned between and connects the inlet 20 of the separator 10 to the holding tank 12. The inlet conduit 22 may have an opening 24 defined by an angled face 26. In use, the angled face 26 can be positioned such that it faces away from a centerline "C" of the holding tank 12. This arrangement points the angled face 26 away from any potential sloshing motion that may occur within the holding tank 12, and this can help prevent at least some of the moisture, liquid, or mixed waste being held within the holding tank 12 from passing into the separator inlet 20.

The separator 10 itself is defined by body wall(s) 30 that surround an internal cavity 32. The body walls 30 are shown as defining a generally kidney-shaped device, with the walls 30 being curved and forming a fluid curved form. However, it should be understood that the body walls may be straight walls, such that the separator has a box-type shape and the walls meet at corners. Any other design or shape for the separator 10 is possible and considered within the scope of this disclosure.

Figure 4:
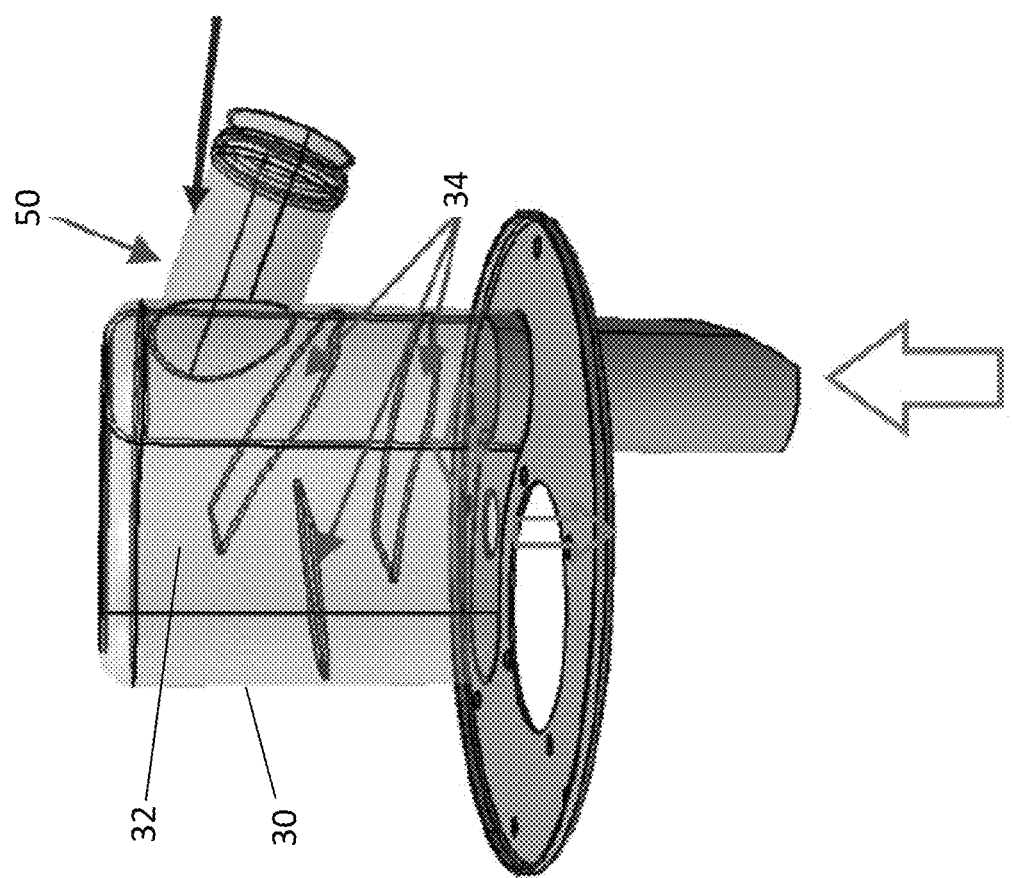
FIG. 4 shows a rear plan transparent view of the separator of FIG. 2.
Figure 5:
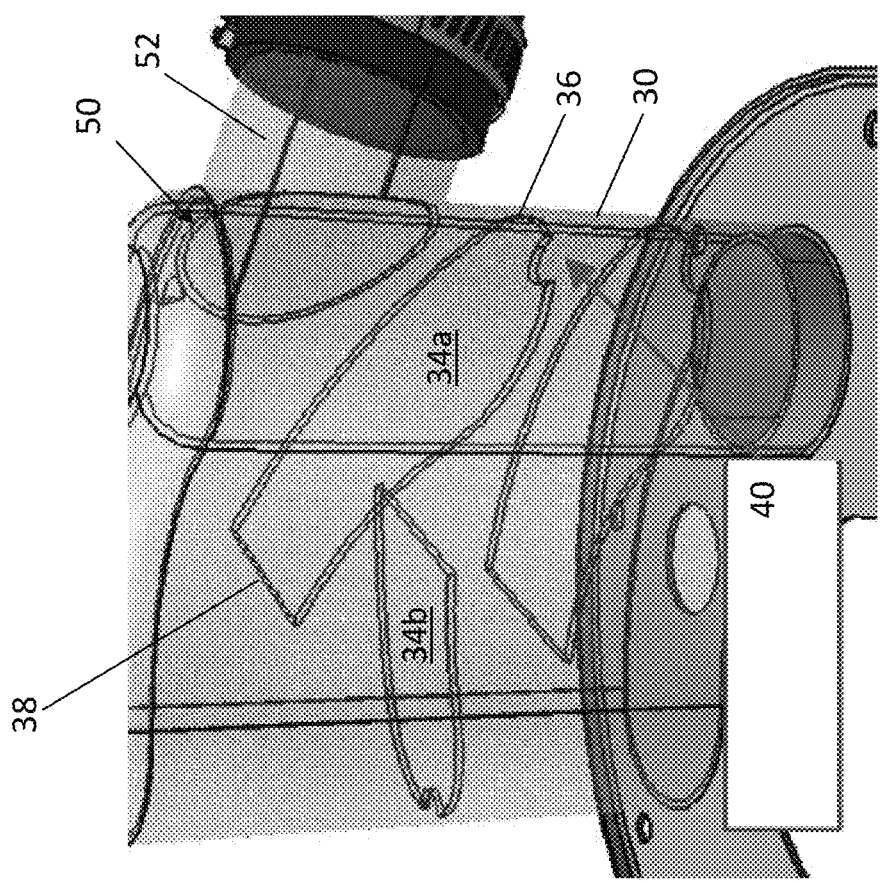
FIG. 5 shows a close-up transparent view of FIG. 4.

In one example, a plurality of baffles 34 may be provided within the separator 10 in order to help create a more tortuous path for air and moisture, to separate air from moisture, and to encourage any collected moisture to flow back into the holding tank 12. In FIGS. 4 and 5, the body walls 30 are shown as having one or more baffles 34 extending therefrom and into the internal cavity 32. The presence of the one or more baffles 34 can help prevent any moisture that may enter the separator 10 from traveling up to and out of the outlet port 50. They function as a blocking feature. Although three baffles 34 are illustrated by the figures, it should be understood that fewer baffles or a greater number of baffles may be provided and are considered within the scope of this disclosure. Additionally, although the baffles 34 are shown as generally paddle-shaped extensions, it is possible for the baffles to be provided in any appropriate shape. For example, they may extend helically from the sidewalls 30 (similar to the helical features described below in connection with the outlet conduit 52). Any design that helps prevent moisture from extending up through the separator 10 and encouraging moisture to collect and/or drain back into the holding tank may be provided.

In one embodiment, the one or more baffles 34 are mounted against the body wall(s) 30 at an angle with respect to the wall 30. In the example shown, this creates a slight downward slope, such that a wall-contacting end 36 of each baffle 34 is lower than its interior end 38. Any moisture that collects on a baffle 34 with such a downward slope is caused to trickle down and toward the body wall 30. It is also possible for each wall contacting end 36 to be provided with an opening 40 where the end 36 of baffle 34 meets the wall 30. This opening 40 may be semicircular shaped as shown, or any other appropriate shape. The general goal is that any moisture that collects on a baffle 34 with such a downward slope is allowed to flow through the opening 40 and be routed back to the holding tank 12 through the inlet 20. This can prevent pooling of collected moisture against the body wall(s) 30.

In the specific example shown, the separator 10 has walls 30 that form a kidney shape, forming left and right curved sides that are joined by an elongated central portion. At least one baffle 34a is mounted on the left side, and at least one baffle 34b is mounted on the right side, and one of the baffles 34 is generally mounted higher than the other of the baffles 34. Any moisture that may be collected on the higher baffle 34a will either drain back through the opening 40, or, if the moisture is collected closer to the interior end 38, the moisture may drop off the end 38 and onto the lower baffle 34b. This moisture may then drain back through the opening 40 of the lower baffle 34b.

Although not shown, it is also possible for one or more of the baffles 34 to be provided with a downward slope, such that a wall-contacting end 36 is mounted higher than an interior end 38. In this embodiment, collected moisture may drain off of the interior ends 38 of each baffle 34. Additionally, although not shown, it is also possible for one or more of the baffles 34 to be perforated and/or to have more openings therethrough (other than or in addition to the opening 40.) This may assist with collected moisture flowing back into the holding tank 12.

The mount angle of any of the described sloped baffles 34 may be any appropriate angle with respect to the body wall(s) 30. It is generally envisioned that the mount angle may be any angle other than a direct 90° angle with respect to the wall, in order to create the described slope. The general goal is that by providing even a slight angle, any moisture that may collect on the one or more baffles 34 can be routed back to the holding tank via the conduit 22.

While the separator/moisture removal concepts are discussed herein for use with aircraft vacuum toilets and specifically, for compact vacuum toilet systems, they are by no means so limited. Rather, embodiments of the separator/moisture removal concepts may be used in connection with any other types of toilets or components in which moisture should be separated from air and/or where it is it desirable that collected moisture be allowed to travel back into a holding tank or other structure.

Figure 6:
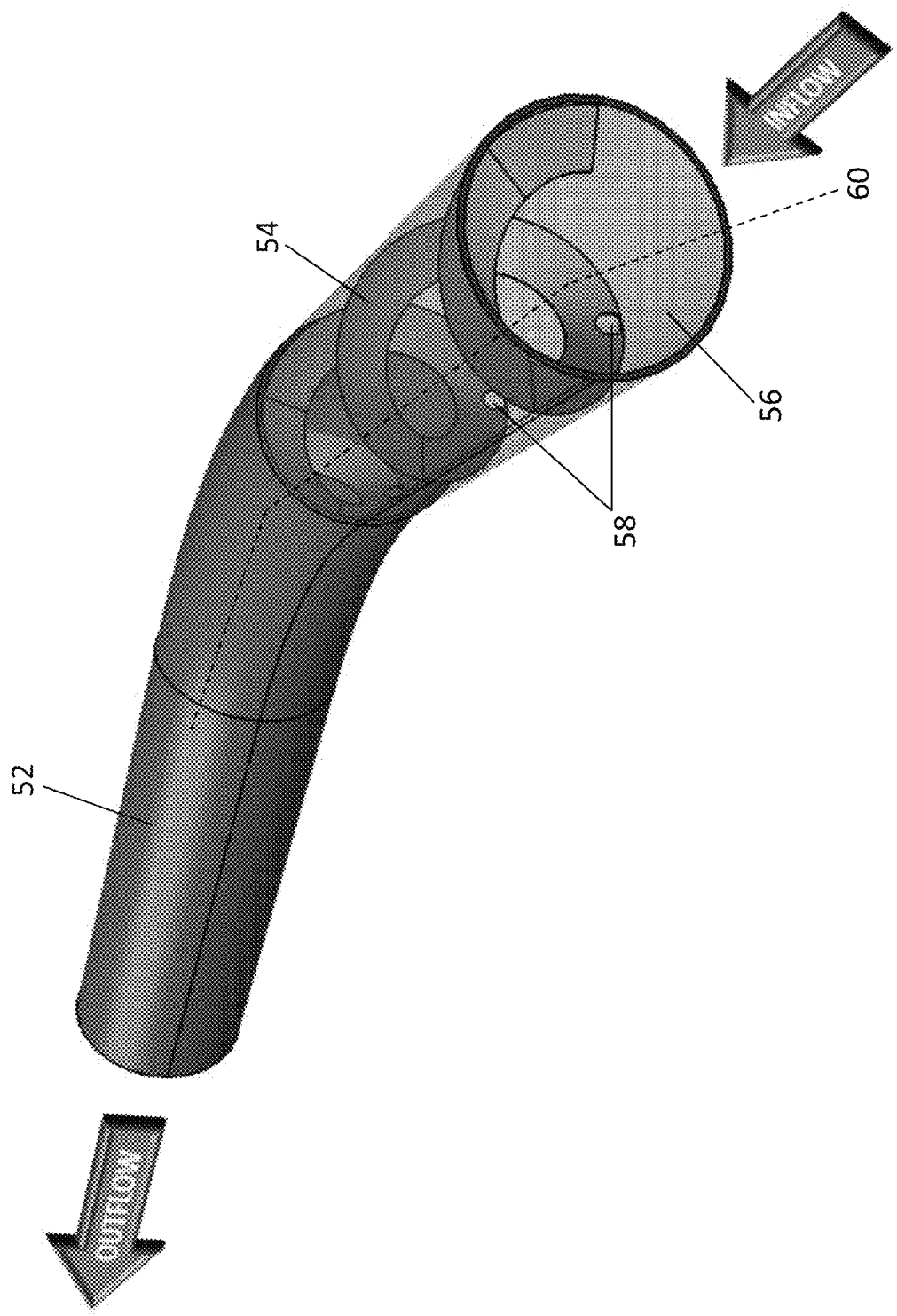
FIG. 6 shows a side perspective and partial transparent view of an outlet conduit which functions as a vent port conduit for embodiments of the separator described herein.

In a further embodiment, which may be incorporated in addition to or instead of the disclosed separator features described above, the outlet conduit 52/vent line may be designed to include an internal helical coil 54. Helical coil 54 can help encourage further drain back of any collected moisture or fluid that may escape the separator 10. As illustrated by FIG. 6, the helical coil 54 may extend in a winding circular pattern around internal walls 56 of the outlet conduit 52/vent line. Alternatively, rather than a helical coil, there also may be provided a plurality of baffles extending into the interior of the outlet conduit, similar to the above-described baffles. In either embodiment, it is generally envisioned that an opening 58 may be provided in order to create a drain flow back into the separator 10 through the conduit 52, to the holding tank 12 or to both, similar in function to the above-described openings 40. As shown, in one example, it is possible for the openings 58 to be provided along a similar axis 60, so that they align and allow a generally even flow line of fluid/moisture back along the axis 60.

The angle of the helical coil 54 (as it extends out from the interior wall 56) may be directionally dependent upon the vacuum generator impeller direction if the concept is used in line with a vacuum generator. It should also be understood that the coil profiles and size may vary, depending upon the diameter of the outlet conduit 52/vent line and/or needs of the system. The general concept is to provide a helical coil or a set of helical fins inside the conduit 52/vent line in order to help capture moisture from the vent air and divert the moisture back to the tank.

In the following, further examples are described to facilitate the understanding of the invention:

Example A: Embodiments of this disclosure may provide a separator configured to be mounted on a holding tank, the separator comprising: an inlet port and an outlet port; a body wall bounding an internal cavity; one or more baffles extending from the body wall into the internal cavity.

Example B: The separator of any of the preceding or subsequent examples, wherein at least one of the one or more baffles defines a slope with respect to the body wall.

Example C: The separator of any of the preceding or subsequent examples, wherein at least one of the one or more baffles comprises an opening formed at a connection point between the at least one baffle and the body wall.

Example D: The separator of any of the preceding or subsequent examples, further comprising an inlet conduit extending from the inlet port.

Example E: The separator of any of the preceding or subsequent examples, wherein the inlet conduit extends into the holding tank and comprises an opening with an angled face.

Example F: The separator of any of the preceding or subsequent examples, further comprising an outlet conduit extending from the outlet port.

Example G: The separator of any of the preceding or subsequent examples, wherein the outlet port functions as a vent port, wherein the outlet conduit leads to a flush valve.

Example H: The separator of any of the preceding or subsequent examples, wherein the outlet conduit comprises a helical coil positioned along its internal wall.

Example I: The separator of any of the preceding or subsequent examples, configured for use in connection with a vacuum toilet system.

Example J: Embodiments may also provide an outlet conduit for use with a separator configured to be mounted on a holding tank, the outlet conduit comprising a helical coil positioned along its internal wall.

Example K: The outlet conduit of any of the preceding or subsequent examples, further comprising one or more openings along a similar axis of the helical coil, such that the openings align and allow a generally even flow line of fluid/moisture back along the axis.

Example L: The outlet conduit of any of the preceding or subsequent examples, configured for use in connection with a vacuum toilet system.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A separator configured to be mounted on a holding tank, the separator including:
   an inlet port configured to receive airflow from the holding tank and an outlet port configured to vent the received airflow;
   a plurality of body walls bounding an internal cavity; and
   one or more baffles, each baffle extending at an angle from at least one body wall of the plurality of body walls into the internal cavity, the one or more baffles comprising a first baffle and a second baffle, wherein a portion of the first baffle extends over a portion of the second baffle,
   wherein each baffle of the one or more baffles defines an opening at a connection point between the baffle and the at least one body wall of the plurality of body walls, wherein, for each baffle, the opening defined at the connection point between the baffle and the at least one body wall is the only opening in the baffle,
   wherein the one or more baffles are arranged within the internal cavity such that any moisture collected on the one or more baffles is directed towards the inlet port.

2. The separator of claim 1, wherein at least one of the one or more baffles defines a slope with respect to the body wall.

3. The separator of claim 1, further comprising an inlet conduit extending from the inlet port.

4. The separator of claim 3, wherein the inlet conduit is configured to extend into the holding tank, and wherein the inlet conduit comprises an opening with an angled face.

5. The separator of claim 1, further comprising an outlet conduit extending from the outlet port.

6. The separator of claim 5, wherein the outlet port functions as a vent port, wherein the outlet conduit leads away from the separator.

7. The separator of claim 5, wherein the outlet conduit comprises a helical coil positioned along its internal wall.

8. The separator of claim 1, configured for use in connection with a vacuum toilet system.

9. An outlet conduit for use with a separator configured to be mounted on a holding tank, the outlet conduit comprising:
- (i) a wall comprising an inner surface and an outer surface, wherein the outer surface of the wall is an outer surface of the outlet conduit, and
- (ii) a helical coil positioned and extending along the inner surface, wherein a plurality of openings are defined in the helical coil, wherein all adjacent openings of the plurality of openings are aligned along an axis and define a flow path for fluid/moisture along the axis, and wherein each opening of the plurality of openings is defined at a connection point between the helical coil and the inner surface of the wall.

10. The outlet conduit of claim 9, configured for use in connection with a vacuum toilet system.

* * * * *